United States Patent [19]

Tanaka

[11] Patent Number: 5,282,020

[45] Date of Patent: Jan. 25, 1994

[54] DEVICE FOR GENERATING HORIZONTAL SCANNING PERIODIC SIGNAL OF PAL-SYSTEM TO OBTAIN CLEAR DISPLAY IMAGE

[75] Inventor: Masahiko Tanaka, Nagoya, Japan

[73] Assignees: Fujitsu Limited, Kawasaki; Fujitsu Devices Inc., Tokyo, both of Japan

[21] Appl. No.: 746,033

[22] Filed: Aug. 16, 1991

[30] Foreign Application Priority Data

Aug. 18, 1990 [JP] Japan .................. 2-217805

[51] Int. Cl.$^5$ .................. H04N 9/44; H04N 9/64; H04N 11/20

[52] U.S. Cl. .................. 358/17; 358/11; 358/36

[58] Field of Search .................. 358/17, 19, 11, 140, 358/36, 167, 192.1, 150, 16; H04N 9/64, 9/44, 9/45, 9/455, 11/20

[56] References Cited

U.S. PATENT DOCUMENTS

| | | | |
|---|---|---|---|
| 4,322,750 | 3/1982 | Lord et al. | 358/140 |
| 4,400,719 | 8/1983 | Powers | 358/11 X |
| 4,660,074 | 4/1987 | Schine | 358/17 X |
| 4,679,005 | 7/1987 | Tatami | 358/17 X |
| 4,769,704 | 9/1988 | Hirai et al. | 358/148 |

FOREIGN PATENT DOCUMENTS

0217648 4/1987 European Pat. Off. ....... H04N 9/64
0392618A1 10/1990 European Pat. Off. .
3212655A1 1/1983 Fed. Rep. of Germany .

OTHER PUBLICATIONS

Elektor Electronics, vol. 14, No. 158, Jul.-Aug. 1988, London, pp. 14-17; J. C. Stekelenburg, "Chrominance-Locked Clock Generator".
Carnt, P. S., Colour Television, vol. 2, London ILIFFE Books Ltd, 1969, pp. 5, 241-266.

Primary Examiner—Mark R. Powell
Assistant Examiner—Safet Metjahic
Attorney, Agent, or Firm—Nikaido, Marmelstein, Murray & Oram

[57] ABSTRACT

A device for generating a horizontal scanning periodic signal used for a PAL-system including a first clear signal generation unit for generating a first candidate clear signal when a value of the counter unit is coincident with a normal horizontal scanning period; a second clear signal generation unit for generating a second candidate clear signal when a value of the counter unit is coincident with a longer horizontal scanning period by an odd multiple of a half period of the color subcarrier frequency than the normal horizontal scanning period; and a selector unit for selecting one of the first candidate clear signal or the second candidate clear signal, wherein the second candidate clear signal is at least one signal selected during one vertical scanning period. Therefore, dot interference in PAL type television standards can be avoided by an easy improvement without increasing the circuit scale.

7 Claims, 14 Drawing Sheets (NTSC—SYSTEM)

(PRIOR ART) (PAL-SYSTEM)

Fig. 5A (PAL-SYSTEM)

□ ⌐ ⌐ : LIGHT
▨ ▨ : DARK

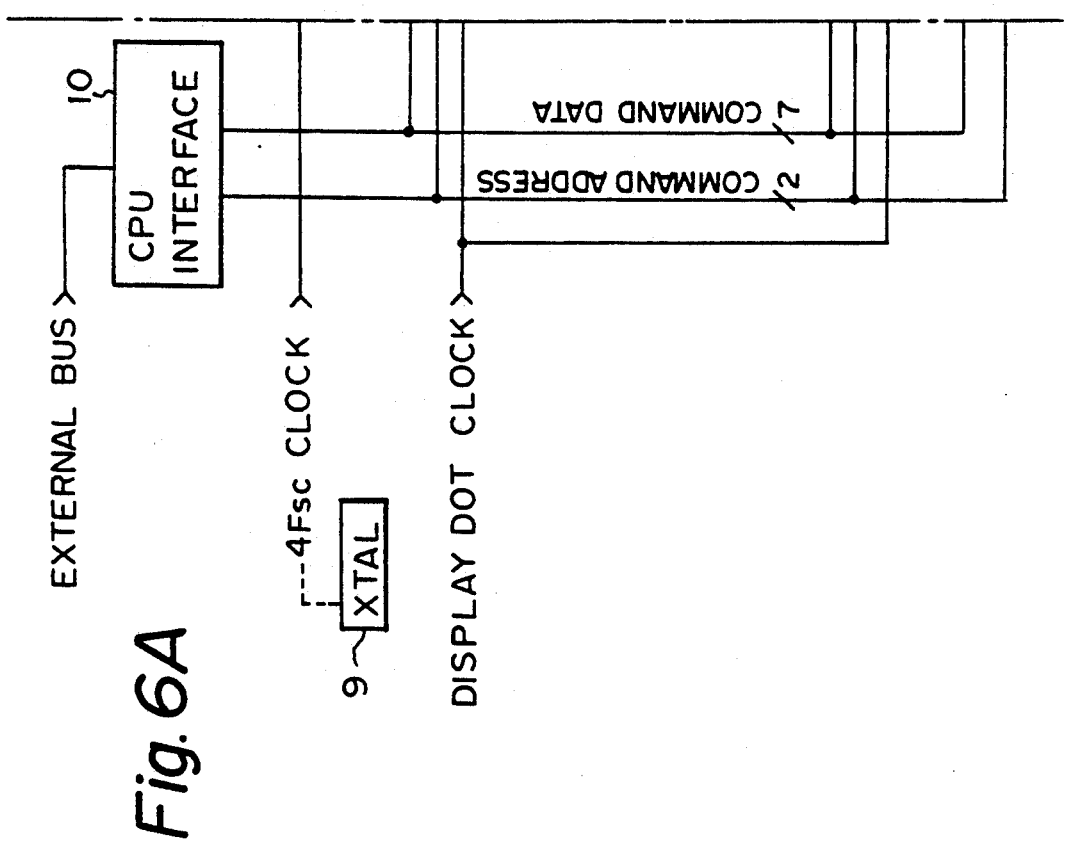

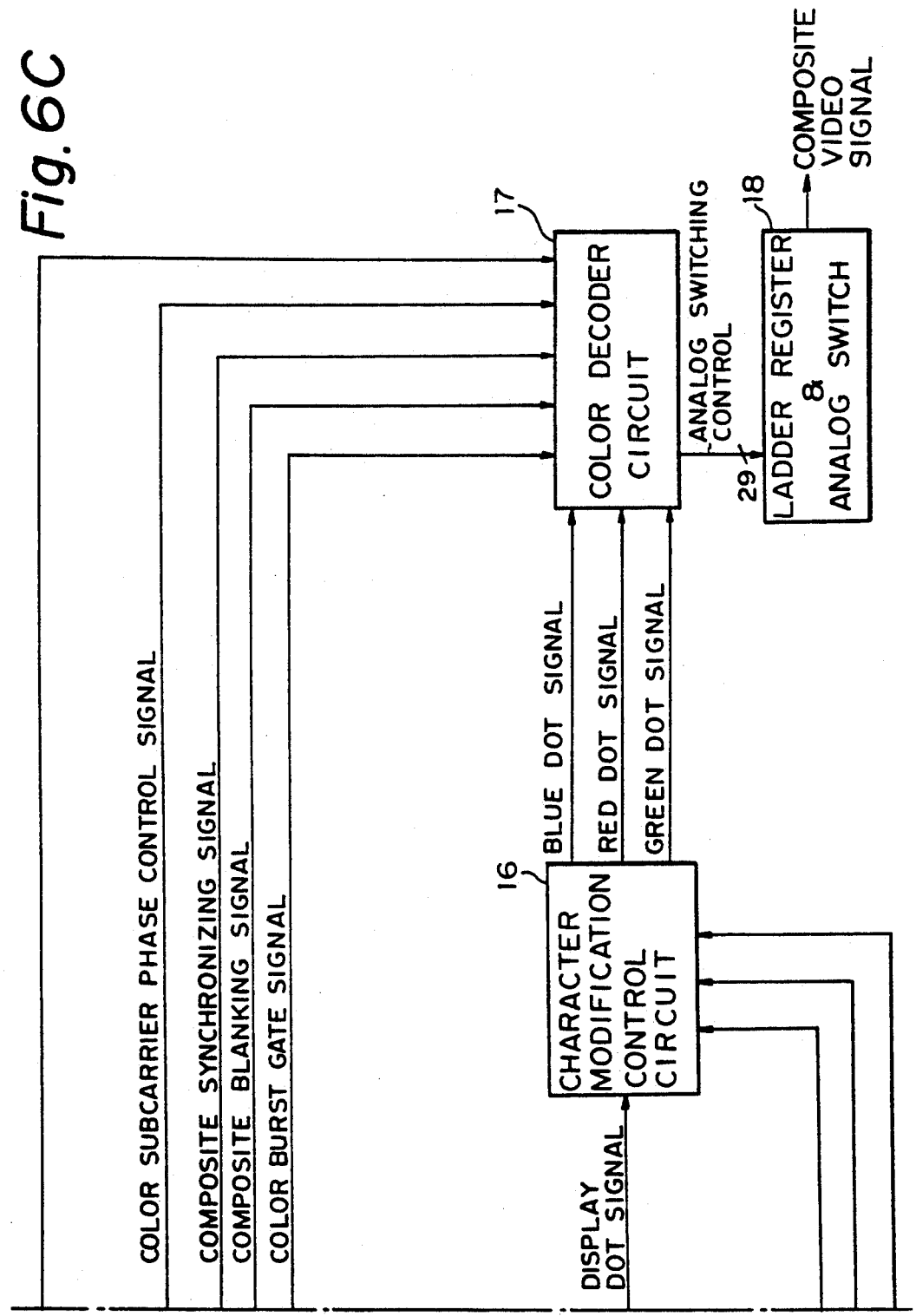

| LLINE | HCLR |
|---|---|
| 0 | ACLR |
| 1 | NCLR |

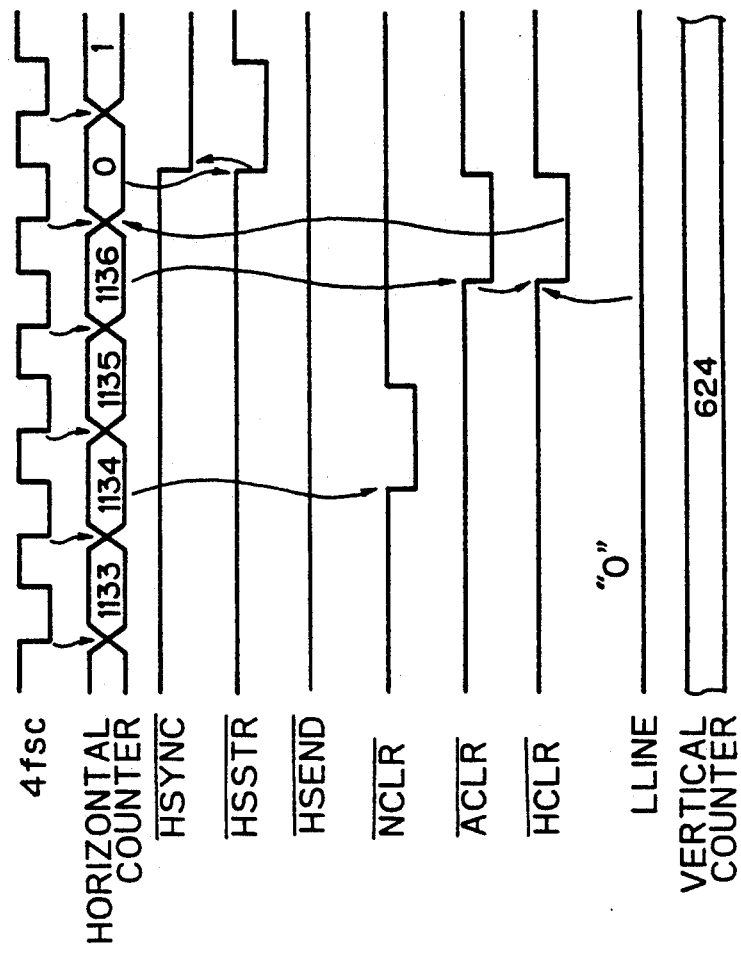

DEVICE FOR GENERATING HORIZONTAL SCANNING PERIODIC SIGNAL OF PAL-SYSTEM TO OBTAIN CLEAR DISPLAY IMAGE

BACKGROUND OF THE INVENTION

1. Field of the Invention

The present invention relates to a device for generating a horizontal scanning periodic signal, more particularly, to a device for generating a horizontal synchronizing signal used in a phase alternation by line color television system (PAL-system).

2. Description of the Related Art

In the prior art, three different systems have been used as color television standards. Namely, a national television system committee color television system (NTSC-system) is employed in Japan, the United States, Korea, and the like; a PAL-system is employed in the United Kingdom, Germany, and the like; and a sequential-a-memoire color television system (SECAM-system) is employed in France, and the like.

Note, the PAL-system has basically the same configuration as the NTSC-system, but in the PAL-system, two chrominance signals are transferred so that a phase of one of the two chrominance signals is inverted by each line. This phase inversion in the PAL-system is used to correct the change caused by transmission lines, and thus saturation distortion can be extremely reduced.

In the PAL-system, the frequency of the basic clock $[4 \times 625 \times F_{SC}]$ (Hz) has been extremely high, and thus there are problems of large numbers of bits used for the counter and the like and a large circuit scale.

In the prior art, in order to solve these problems, an approximate equation is used instead of an original equation. When using the approximate equation, the frequency of the basic clock can be reduced as $[4 \times F_{SC}]$ (Hz) which is lower by 1/625 than the above frequency of the basic clock $[4 \times 625 \times F_{SC}]$ (Hz), so that the bits used for the counter and the like can be reduced and the circuit can be much smaller.

However, an error between the frequency of the color subcarrier (color burst signal) obtained by the approximate equation and the exact frequency of the color subcarrier is caused, so that a change of light and darkness between the adjacent scanning lines may be caused. Therefore, when displaying an image of a small movement. e.g., an image of characters, a flicker (or dot interference) may be caused, and the quality of the display image may be decreased. Note, the problems caused in the prior art will be explained later with reference to the accompanying drawings.

SUMMARY OF THE INVENTION

An object of the present invention is to provide a device for generating a horizontal scanning periodic signal (or horizontal synchronizing signal) for avoiding dot interference in the PAL-system by an easy improvement without increasing the circuit scale.

According to the present invention, there is provided a device for generating a horizontal scanning periodic signal used for a PAL-system comprising: a clock generation unit for generating a basic clock having a frequency specified as any multiple of a color subcarrier frequency; a counter unit, connected to the clock generation unit, for counting the basic clock until a specific clear signal is input; a first clear signal generation unit, connected to the counter unit, for generating a first candidate clear signal when a value of the counter unit is coincident with a normal horizontal scanning period, by monitoring the value of the counter unit; a second clear signal generation unit, connected to the counter unit, for generating a second candidate clear signal when a value of the counter unit is coincident with a longer horizontal scanning period longer by an odd multiple of a half period of the color subcarrier frequency than the normal horizontal scanning period, by monitoring the value of the counter unit; and a selector unit, connected to the first and second clear signal generation unit and the counter unit, for selecting one of the first candidate clear signal or the second candidate clear signal, wherein the second candidate clear signal is at least one signal selected during one vertical scanning period.

The device may be used for a PAL-system using the following approximate equation for the color subcarrier frequency: $F_{SC} = ((4 \times n - 1)/4) \times F_L$ where, $F_L$ denotes a horizontal frequency.

The basic clock may be specified as four times a color subcarrier frequency. The second clear signal generation unit may generate the second candidate clear signal when a value of the counter unit is coincident with a period longer by a half period of the color subcarrier frequency than the normal horizontal scanning period. The first clear signal generation unit may be constituted by a 1135-counter, and the second clear signal generation unit may be constituted by a 1137-counter.

The second candidate clear signal may be selected at the scanning line located on the upper or lower side of each field. The second candidate clear signal may be selected at the 312th or 625th scanning lines of each field.

According to the present invention, there is also provided a video signal generation device comprising: a clock generation unit for generating a basic clock; a memory sequencer for controlling various memory portions by receiving command data, command addresses, a display dot clock, a horizontal synchronizing signal, and a vertical synchronizing signal; a SYNC generator, connected to the clock generation unit and the memory sequencer, for generating the horizontal synchronizing signal, the vertical synchronizing signal, and various timing signals in accordance with the basic clock; and a color decoder circuit, operatively connected to the memory sequencer, for decoding red, blue, and green dot signals of a specific display image in accordance with various timing signals output from the SYNC generator.

The SYNC generator may comprise: a horizontal counter, connected to the clock generation unit, for counting the basic clock; a horizontal decoder, connected to the horizontal counter, for generating a first candidate clear signal and a second candidate clear signal, wherein the second candidate clear signal is output at the timing longer by a half period of a color subcarrier frequency than a horizontal scanning period, by monitoring the value of the horizontal counter; a selector, connected to the horizontal decoder, for selecting one of the first candidate clear signal or the second candidate clear signal, wherein the second candidate clear signal is at least one signal selected during one vertical scanning period. The video signal generation device may be constituted as an on screen display controller device.

BRIEF DESCRIPTION OF THE DRAWINGS

The present invention will be more clearly understood from the description of the preferred embodiments as set forth below with reference to the accompanying drawings, wherein:

FIGS. 5A and 5B are diagrams indicating an example of a display image obtained by using a device for generating a horizontal synchronizing signal of a PAL-system according to the present invention;

FIGS. 6A, 6B, 6C are a block diagram indicating an embodiment of a device for generating a horizontal synchronizing signal according to the present invention;

FIGS. 11 to 13 are diagrams indicating operational waveforms of the embodiment of the device for generating the horizontal synchronizing signal according to the present invention.

DESCRIPTION OF THE PREFERRED EMBODIMENTS

Figure 1A:
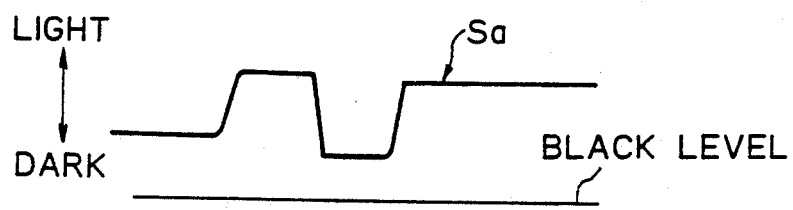
FIGS. 1A to 1E are diagrams for explaining a frequency interlace method.
Figure 1B:
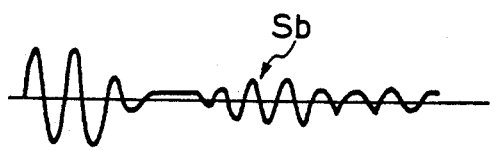

First, for a better understanding of the preferred embodiments, an NTSC-system and problems of a PAL-system in the prior art will be explained.

In the color television systems of Japan, the United States, and the like, an NTSC-system have been employed due to considerations of the compatibility between color television broadcasting and monochrome (black and white) television broadcasting.

In this NTSC-system, primary colors of red (R), green (G), and blue (B) of an object (or an objective image) are transferred by a luminance signal and color difference signals. First, when those signals are received by a color television receiver, the primary colors are obtained by the luminance signal and the color difference signals, so that a color image of the object can be displayed at the color television receiver. On the other hand, when those signals are received by a monochrome television receiver, a black and white image of the object can be displayed at the monochrome television receiver by only using the luminance signal.

Note, the color difference signals, which are the signals defined by subtracting the luminance signal from each of the primary colors (R, G, B), are constituted by R-Y, G-Y, and B-Y signals, wherein only two signals R-Y and B-Y (which are called chrominance signals) are transferred, and the remaining signal G-Y is reproduced at the television receiver in accordance with the transferred two chrominance signals R-Y and B-Y.

Further, the frequency of the luminance signal and the chrominance signals are selected to alternately generate each spectrum of the luminance signal and the chrominance signals within a transmission band (0 to 4 MHz) of the television signals. Namely, the frequency of the chrominance signals is selected such that higher harmonic spectrum of the chrominance signals is included in an interval of a higher harmonic spectrum of the luminance signal (or an interval of a horizontal scanning frequency). Note, this means that the frequency of the chrominance signals (which corresponds to I-signal and Q-signal of a color subcarrier frequency instead of the chrominance signals) is selected as an odd multiple of a half of the horizontal scanning frequency.

Concretely, the authorized color subcarrier frequency is specified as 3.58 MHz (exactly 3.579545 MHz). This frequency corresponds to 455 times the frequency of 7.875 kHz (exactly 7.867132 kHz). The frequency of 7.875 kHz is a half of the horizontal scanning frequency of 15.750 kHz (exactly 15.734264 kHz). Therefore, when a carrier frequency is selected as odd multiple (1, 3, 5, ......) of the frequency of 7.875 kHz, the higher harmonic spectrum of the chrominance signals can be included in the center of the higher harmonic frequency of 15.750 kHz.

This frequency allotment, which is carried out by inserting the frequency, is called a frequency interlace method (or frequency interleaving method) and is already known in the prior art.

Concretely, in the NTSC-system, the color subcarrier frequency is selected by an equation $(f_H/2) \times 455$ (wherein, $f_H$ is selected as a horizontal scanning frequency). Namely, a position of the color subcarrier frequency can be located at the center between the 227th higher harmonic and 228th higher harmonic of the horizontal scanning frequency (or the frequency of the horizontal synchronizing signal). Therefore, an unpreferable phenomenon, for example, a phenomenon of a wave shape image (or stripes) on the received display image when receiving the transferred electric wave, can be eliminated by applying the frequency interlace method.

Next, the reasons for eliminating the wave shape image from the received display image will be explained with reference to FIGS. 1A to 1E.

FIGS. 1A to 1E are diagrams for explaining a frequency interlace method. In FIGS. 1A to 1E, when assuming a reference Sa to a luminance signal along a first scanning line of an optional frame (with reference to FIG. 1A) and further assuming a reference Sb to a chrominance signal (or chrominance signals: with reference to FIG. 1B), light and darkness are caused on a first scanning line of a television picture tube by the luminance signal Sa. Further, at the same time, light and darkness are also caused on the television picture tube by the chrominance signal Sb, so that the above unpreferable phenomenon may be caused.

Figure 1C:
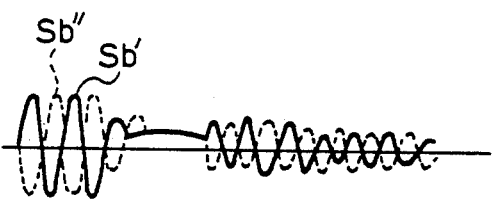
Figure 1D:
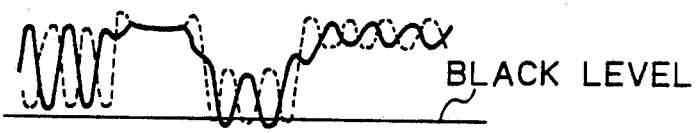
Figure 1E:
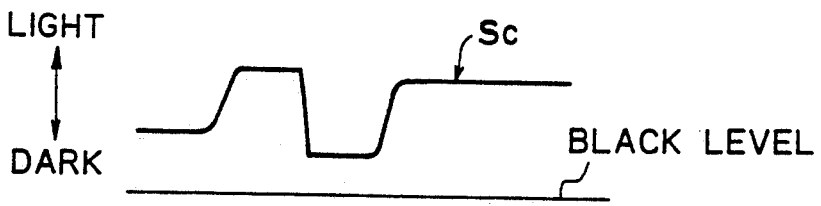

Nevertheless, when synchronizing the color subcarrier frequency to the horizontal scanning frequency, and when determining the color subcarrier frequency as an odd multiple of a half of the horizontal scanning frequency, as shown in FIG. 1C, a phase of a chrominance signal Sb″ along the first scanning line of the next frame is opposite to that of a chrominance signal Sb′ along a scanning line of the first frame. Therefore, as shown in FIG. 1D, these chrominance signals Sb′ and Sb″ are mixed, and a wave form Sc is obtained, so that, as shown in FIG. 1E, disusable light and darkness of the chrominance signals can be negated.

Namely, when selecting the frequency of the color subcarrier to satisfy the equation $(f_H/2) \times 455$, the change in brightness caused by the carrier signal between the two adjacent scanning lines can be made inconspicuous, and thus the visual trouble can be eliminated.

Figure 2A:
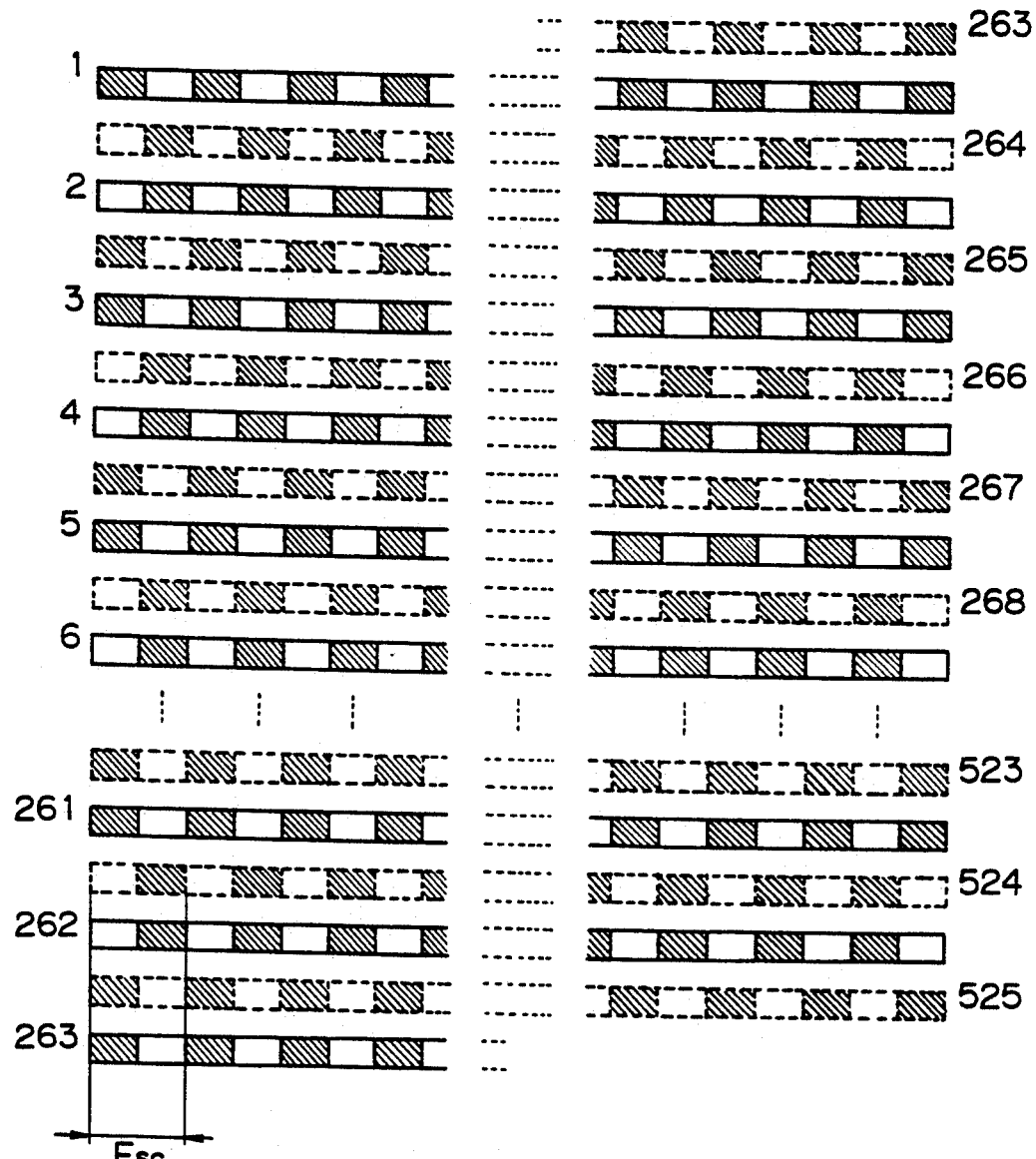
FIGS. 2A and 2B are diagrams indicating an example of a display image using an NTSC-system.
Figure 2B:
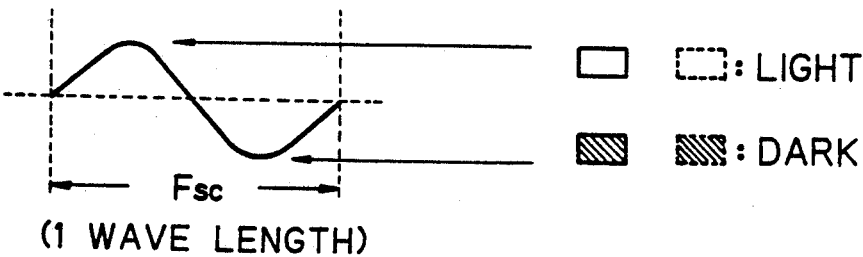

FIGS. 2A and 2B are diagrams indicating an example of a display image using an NTSC-system. Note, as shown in FIG. 2A, an interlaced scanning method, which is known in the prior art, is employed. Further, the display image shown in FIG. 2A is returned every two frames (or four fields), and the next frame displayed continuing from the display image (current frame) shown in FIG. 2A is omitted.

As shown in FIG. 2A, in the NTSC-system, a display image (or frame) is constituted by 525 scanning lines and one frame is formed by two fields each constituted by 262.5 scanning lines. Namely, one field is formed by scanning line numbers from 1 to 263 (preceding half of the line number 263) in a first 1/60 second, which are described by solid lines in FIG. 2A, and the other field is formed by scanning line numbers from 263 (following half of the line number 263) to 525 in a next 1/60 second, which are described by broken lines in FIG. 2A. Note, each of the first and second fields is formed by 1/60 second, and thus each frame is formed by 1/30 second. Further, as shown in FIG. 2B, a blank area denotes a light point and a hatched area denotes a dark point, and each area (or each point) corresponds to a half of one wave length ($F_{SC}$).

As clearly shown in FIG. 2A, in a vertical direction (lengthwise direction), blank areas of a 264th scanning line (scanning line number 264) and a second scanning line (scanning line number 2) are placed between hatched areas of a first scanning line (scanning line number 1) and a 265th scanning line (scanning line number 265), and blank spaces of a 265th scanning line and a third scanning line are placed between hatched areas of the second scanning line and a 266th scanning line. Namely, in the NTSC-system, the phase of the color subcarrier signal (color burst signal) of the two adjacent scanning lines (first and second scanning lines, 264th and 265th scanning lines, and the like) in the same field is different by 180 degrees, and thus blank areas of the two adjacent scanning lines in the same field are inverted to hatched areas, so that disusable light and darkness of the chrominance signals can be negated and a clear display image can be obtained.

Incidentally, a PAL-system is employed in Asia or Europe (for example, United Kingdom, and Germany) instead of the above described NTSC-system.

This PAL-system has fundamentally the same configuration as the NTSC-system, but in the PAL-system, two chrominance signals are transferred so that a phase of one of the two chrominance signals is inverted by each line.

This phase inversion in the PAL-system is used to correct the change caused by transmission lines, and thus saturation distortion can be extremely reduced.

In the PAL-system, a color subcarrier frequency $F_{SC}$ and a horizontal scanning frequency $F_L$ are determined to satisfy the following equation (2).

$$F_{SC} = (n - \tfrac{1}{4}) F_L + F_F = (((4 \times n - 1)/4) + (F_F/F_L)) \quad (2)$$

Where, $F_{SC}$: frequency of color subcarrier (4.43361875 MHz)
$F_L$: horizontal scanning frequency (15.625 kHz)
$F_F$: field frequency (50 Hz)
n: position of color subcarrier in video signal band (for example, n=248)

Note, in the PAL-system, the ratio ($F_F/F_L$) specified between the field frequency $F_F$ and the horizontal scanning frequency $F_L$ is set to 1/625, and thus the above equation (2) is converted to the following equation (3).

$$F_{SC} = (((4 \times n - 1) \times 625 + 4)/(4 \times 625)) \times F_L) \quad (3)$$

This equation (3) means that an exact frequency of the color subcarrier can be generated by counting a basic clock $[4 \times 625 \times F_{SC}]$ (Hz) $[((4 \times n - 1) \times 625 + 4)]$ times. However, in accordance with the above PAL-system, the frequency of the basic clock is extremely high, and thus there are problems of a large number of bits used for the counter and the like and a large circuit scale.

In the prior art, to solve the above problems, the above equation (3) was replaced by the following approximate equation (4).

$$F_{SC}' = ((4 \times n - 1) \times F_L) \quad (4)$$

By using this approximate equation, the frequency of the basic clock can be reduced as $[4 \times F_{SC}]$ which is lower by 1/625 than the above frequency of the basic clock $[4 \times 625 \times F_{SC}]$, so that the number of bits used for the counter and the like can be reduced and the circuit scale can be reduced.

However, an error is caused between the frequency $F_{SC}'$ of the color subcarrier obtained by the above approximate equation and the exact frequency $F_{SC}$ of the color subcarrier, so that a change of light and darkness between the two adjacent scanning lines may be caused. Therefore, when displaying a display image of a small movement, e.g., an image of characters, a flicker (which is called dot interference) may be caused. Note, when dot interference is caused, dots located at a contour of the image (character) are moved, and thus the quality of the display image is decreased.

Namely, when the color subcarrier frequency $F_{SC}$ is specified as an exact frequency, the dot interference can be eliminated by using the above described frequency interlace method. However, when using the color subcarrier frequency $F_{SC}'$ obtained by the approximate equation, frequency error cannot be avoided. Also, the phases of the chrominance signals of the adjacent scanning lines are uniform, so that the above described problems are caused.

Figure 3A:
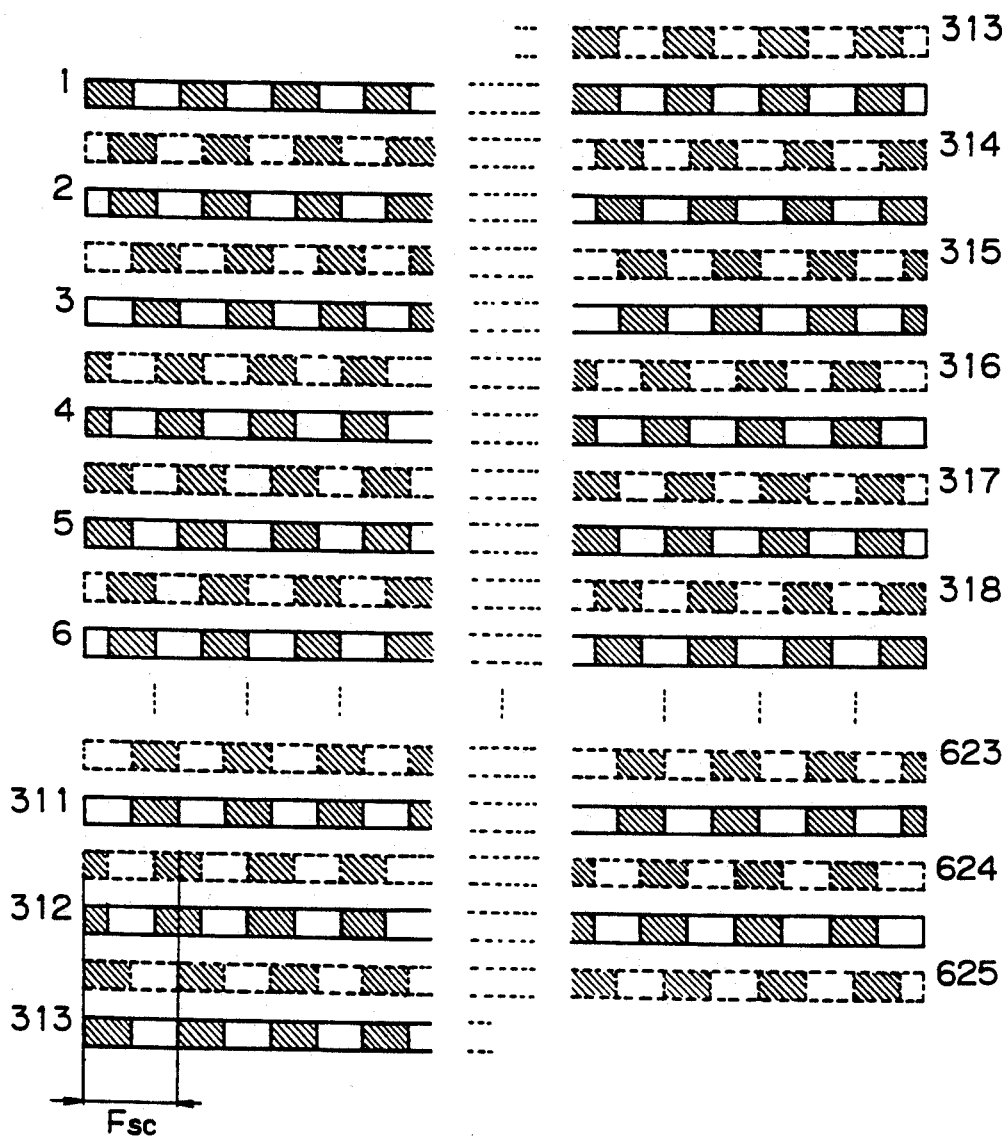
FIGS. 3A and 3B are diagrams indicating an example of a display image using a PAL-system according to the prior art.
Figure 3B:
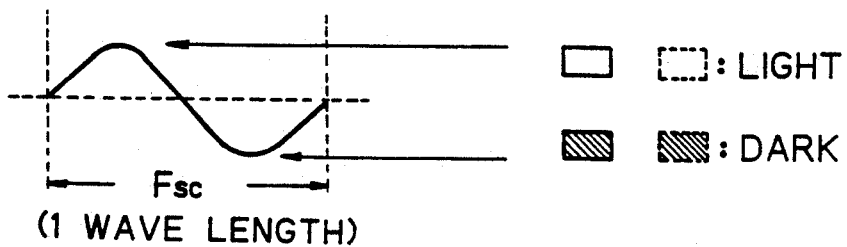

FIGS. 3A and 3B are diagrams indicating an example of a display image using a PAL-system according to the prior art. Note, as shown in FIG. 3A, an interlaced scanning method, is employed, and the display image shown in FIG. 3A is formed by using the above approximate equation (4). Further, the display image shown in FIG. 3A is returned by every four frames (or eight fields), and the following three frames from the display image (current frame) shown in FIG. 3A are omitted.

As shown in FIG. 3A, in the PAL-system, a display image (or frame) is constituted by 625 scanning lines and one frame is formed by two fields each constituted by 312.5 scanning lines. Namely, one field is formed by scanning line numbers from 1 to 313 (preceding half of the line number 313) in a first 1/50 second, which are described by solid lines in FIG. 3A, and the other field is formed by scanning line numbers from 313 (following half of the line number 313) to 625 in a next 1/50 second, which are described by broken lines in FIG. 3A. Note, each of the first and second fields is formed by 1/50 second, and thus each frame is formed by 1/25 second. Further, as shown in FIG. 3B, a blank area denotes a light point and a hatched area denotes a dark point, and each area (or each point) corresponds to a half of one wave length ($F_{SC}$).

As clearly shown in FIG. 3A, in a vertical direction (lengthwise direction) of the frame, two adjacent blank (hatched) areas of a 314th and a second scanning lines, a 315th and a third scanning lines, a 316th and a fourth scanning lines, and the like are gradually transferred to the right side while going to the lower side. In the same field, blank (hatched) areas of each scanning line are transferred to the right side while along with the increase of the scanning line number due to the delay of ¼ period ($4F_{SC}$). Namely, in the PAL-system using the above approximate equation ④, the phase of the color subcarrier signal (color burst signal) of the two adjacent scanning lines (first and second scanning lines, 314th and 315th scanning lines, and the like) in the same field is different by 90 degrees, and thus blank (hatched) areas of the scanning line in the same field are delayed by 90 degrees (¼ period). Therefore, stripes appear on the display image, or a flicker (dot interference) is caused, so that the quality of the display image is decreased.

Next, the basic configuration and the preferred embodiments of a device for generating a horizontal synchronizing signal according to the present invention will be explained.

Figure 4:
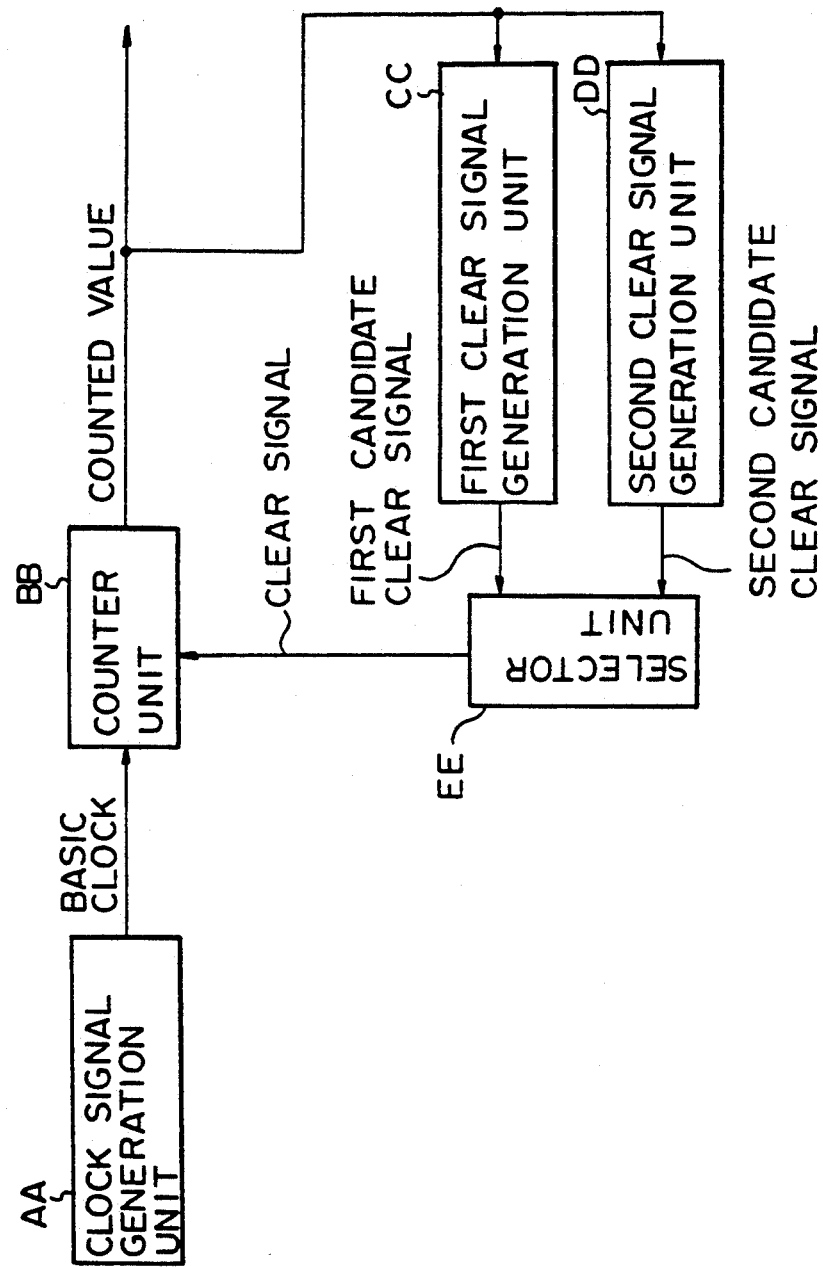
FIG. 4 is a block diagram indicating the basic configuration of a device for generating a horizontal synchronizing signal according to the present invention.

FIG. 4 is a block diagram indicating the basic configuration of a device for generating a horizontal synchronizing signal according to the present invention. As shown in FIG. 4, a system for generating a horizontal synchronizing signal comprises a clock signal generation unit AA, a counter unit BB, a first clear signal generation unit CC, a second clear signal generation unit DD, and a selector unit EE.

The clock generation unit AA is used to generate a basic clock having a frequency specified as any multiple of a color subcarrier frequency, and the counter unit BB is used to count the basic clock until a specific clear signal is input. The first clear signal generation unit CC is used to generate a first candidate clear signal when a value of the counter unit is coincident with one horizontal scanning period (or one period of the horizontal synchronizing signal), by monitoring the value of the counter unit. The second clear signal generation unit DD is used to generate a second candidate clear signal when a value of the counter unit is coincident with a period longer by a half period of the color subcarrier frequency than the one horizontal scanning period, by monitoring the value of the counter unit. The selector unit EE is used to select the first candidate clear signal as the specific clear signal, and further the selector unit EE is used to select the second candidate clear signal as the specific clear signal during one vertical scanning period.

In the device for generating the horizontal synchronizing signal according to the present invention, a basic clock (for example, $4F_{SC}$) having a frequency specified as any multiple (for example, four times) of a color subcarrier frequency $F_{SC}$ is counted, and the count value is cleared by each horizontal scanning period (horizontal synchronizing signal) and is also cleared at least once in one vertical scanning period by a period which is longer by a half period of the color subcarrier frequency than the one horizontal scanning period.

Therefore, a length of one horizontal scanning period (one field) is set to [horizontal scanning period $(F_L) \times 625 + \alpha$] ($\alpha$: a half period of $F_{SC}$), and phases of the chrominance signals in the continuous fields are inverted, so dot interference between the adjacent scanning lines can be eliminated.

Figure 5B:
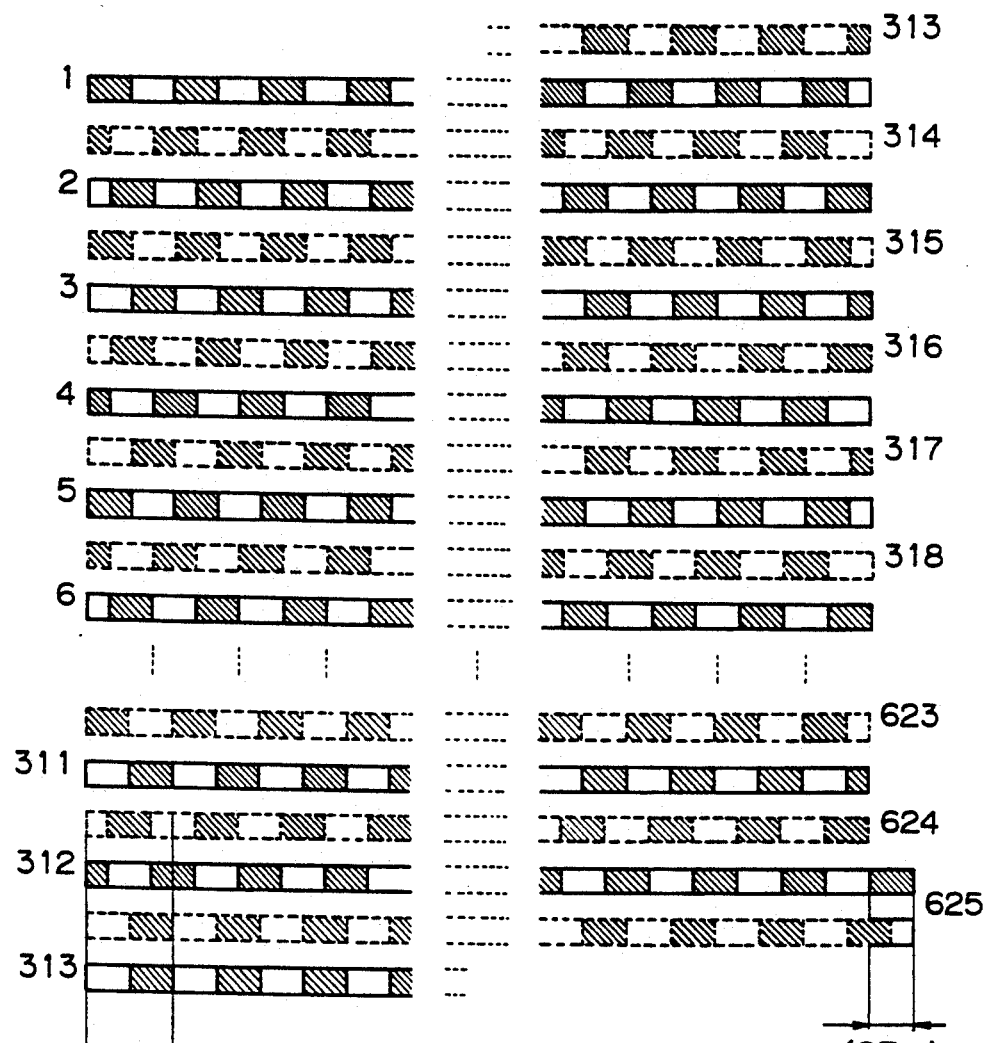
Figure 5B:
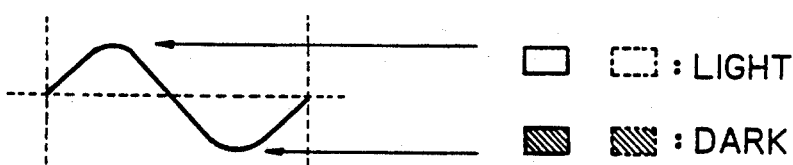

FIGS. 5A and 5B are diagrams indicating an example of a display image obtained by using a device for generating a horizontal synchronizing signal of a PAL-system according to the present invention. Note, as shown in FIG. 5A, an interlaced scanning method, is employed, and the display image shown in FIG. 5A is formed by using the above approximate equation ④ and also using the above described configuration with reference to FIG. 4. Further, the display image shown in FIG. 5A is returned by every four frames (or eight fields), and the following three frames from the display image (current frame) shown in FIG. 5A are omitted.

As shown in FIG. 5A, in the PAL-system, a display image (or frame) is constituted by 625 scanning lines and one frame is formed by two fields each constituted by 312.5. Namely, one field is formed by scanning line numbers from 1 to 313 (preceding half of the line number 313) in a first 1/50 second, which are described by solid lines in FIG. 5A, and the other field is formed by scanning line numbers from 313 (following half of the line number 313) to 625 in a next 1/50 second, which are described by broken lines in FIG. 5A. Note, each of the first and second fields is formed by 1/50 second, and thus each frame is formed by 1/25 second. Further, as shown in FIG. 5B, a blank area denotes a light point and a hatched area denotes a dark point, and each area (or each point) corresponds to a half of one wave length ($F_{SC}$).

Note, in the display image (or frame) shown in FIG. 5A, each of the scanning lines 312 and 625 located at the lower side of the display image includes an additional area corresponding to $2F_{SC}$, or ½ wave length, so that stripes do not appear on the display image, or a flicker (dot interference) is not caused.

Concretely, as clearly shown in FIG. 5A, in a vertical direction (lengthwise direction) of the frame, blank (hatched) areas of a first scanning line appear on a 315th scanning line, a fifth scanning line, and the like; blank (hatched) areas of a 314th scanning line appear on a fourth scanning line, a 318th scanning line, and the like; and blank (hatched) areas of a second scanning line appear on a 316th scanning line, a sixth scanning line, and the like. Namely, in the same field, blank (hatched) areas of each scanning line appear every four scanning lines, whose relationships are the same as that shown in FIG. 3A. Nevertheless, in the same frame, the phase of the color subcarrier signal (color burst signal) of all of the two adjacent scanning lines (first and 314th scanning lines, 314th and second scanning lines, and the like) is different by 90 degrees, and thus blank (hatched) areas of the scanning line in the same field are delayed or advanced by 90 degrees (¼ period). Therefore, stripes do not appear on the display image, or a flicker (dot interference) is not caused, so that the dot interference is avoided by an easy improvement without increasing the circuit scale.

As described above with reference to FIG. 5A, each of the scanning lines 312 and 625 located at the lower side of the display image includes an additional area corresponding to $2F_{SC}$, but the additional area corresponding to $2F_{SC}$ (or ½ wave length) is not limited to the 312th and 625th scanning lines. Nevertheless, in each field, the additional area is preferably provided for the end portion of the scanning line close to the upper or lower sides. Concretely, the additional area corresponding to $2F_{SC}$ (or ½ wave length) can be provided for the 311th and 624th scanning lines, 624th and 312th scanning lines, 313th and first scanning lines, or first and 314th scanning lines. Further, the additional area is not only limited to the area corresponding to $2F_{SC}$ (or ½ wave length), but also the additional area can be specified as odd multiples of $2F_{SC}$ (or ½ wave length), e.g., 3/2 wave length, or 5/2 wave length.

Figure 6B:
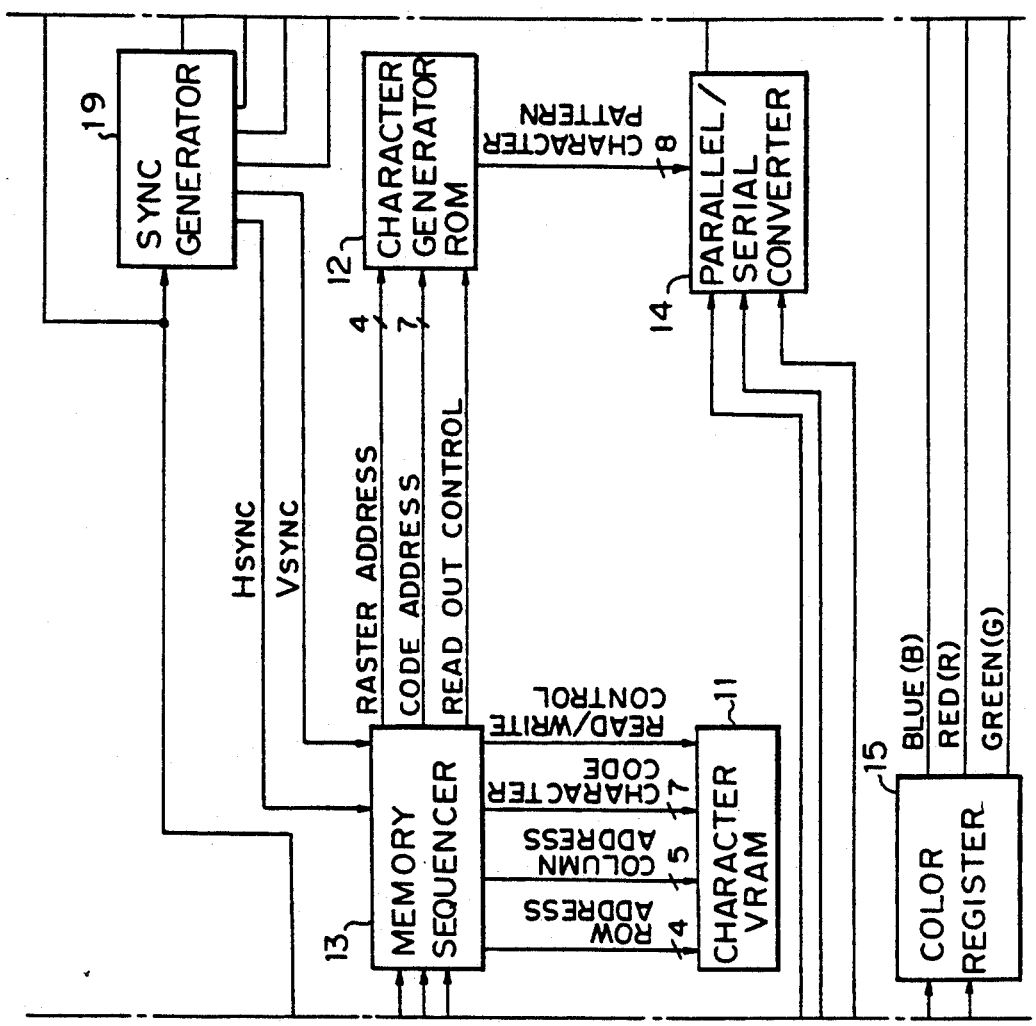

FIG. 6 is a block diagram indicating an embodiment of a device for generating a horizontal synchronizing signal according to the present invention.

As shown in FIG. 6, the video signal generation device (or OSDC: on screen display controller) roughly comprises a CPU interface 10, a memory sequencer 13, a parallel/serial converter 14, a character modification control circuit 16, a color decoder circuit 17, a ladder register and analog switch 18, and a SYNC generator 19.

The CPU interface 10 is used to connect the video signal generation device to a computer (CPU) through an external bus. The memory sequencer 13 is used to control various memory portions (for example, a character video RAM 11 or a character generator ROM 12) by receiving command data, command addresses, a display dot clock, a horizontal synchronizing signal ($H_{SYNC}$), and a vertical synchronizing signal ($V_{SYNC}$). The parallel/serial converter 14 is used to convert a character pattern read out from the character generator ROM 12 into a serial sequence in accordance with the command data, the command addresses, and the display dot clock.

The character modification control circuit 16 is used to generate red, blue, and green dot signals by adding color information output from a color register 15 to the serial-converted display dot signal. The color decoder circuit 17 is used to decode the red, blue and green dot signals in accordance with various timing signals of a basic clock signal ($4F_{SC}$), a color subcarrier phase control signal, a composite synchronizing signal, a composite blanking signal, a color burst gate signal, and the like. The ladder register and analog switch 18 is used to generate an analog composite video signal in accordance with an output of the color decoder circuit 17. The SYNC generator 19 is used to generate the above described horizontal synchronizing signal ($H_{SYNC}$), the vertical synchronizing signal ($V_{SYNC}$), and various timing signals.

Figure 7:
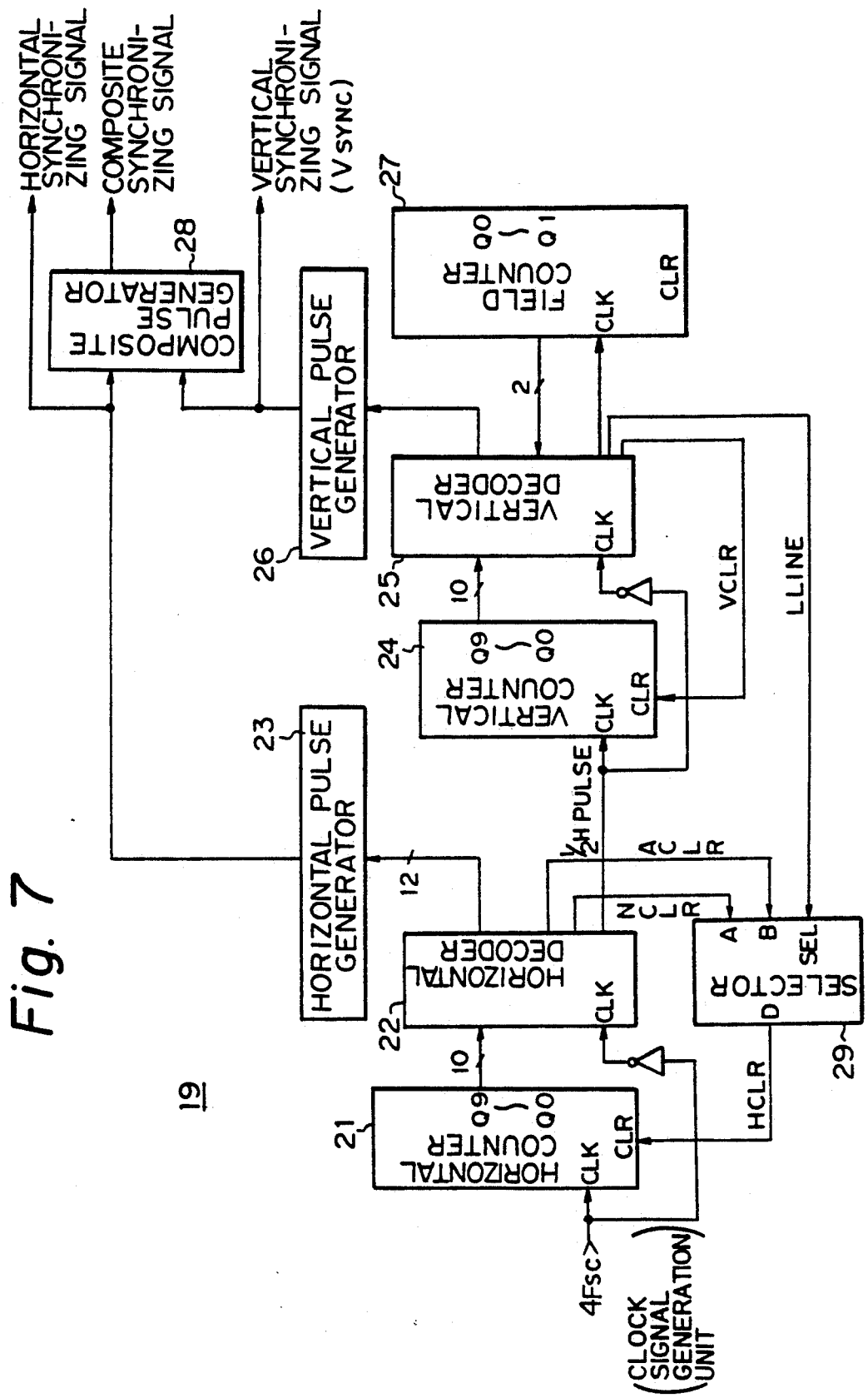
FIG. 7 is a block diagram indicating an example of the SYNC generator shown in FIG. 6.

FIG. 7 is a block diagram indicating an example of the SYNC generator shown in FIG. 6. As shown in FIG. 7, the SYNC generator 19 comprises a horizontal counter 21, a horizontal decoder 22, a horizontal pulse generator 23, a vertical counter 24, a vertical decoder 25, a vertical pulse generator 26, a field counter 27, a composite pulse generator 28, and a selector 29.

The horizontal counter 21 is constituted by a 10-bit counter for counting the basic clock ($4F_{SC}$) by 0 to 1134 (or 0 to 1136) corresponding to one horizontal scanning period (which may be called 1H) in the PAL-system while synchronizing a trailing edge of the basic clock. The horizontal decoder 22 is used to decode an output of the horizontal counter 21 and to generate various horizontal timing signals. The horizontal pulse generator 23 is used to generate various horizontal pulse signals in accordance with an output of the horizontal decoder 22.

The vertical counter 24 is constituted by a 10-bit counter for counting the ½H pulse of the horizontal decoder 22 by 0 to 624 corresponding to one vertical scanning period (which may be called 1 V) in the PAL-system while synchronizing a trailing edge of the ½H pulse. The vertical decoder 25 is used to decode an output of the vertical counter 24 and to generate various vertical timing signals. The vertical pulse generator 26 is used to generate various vertical pulse signals in accordance with an output of the vertical decoder 25.

The field counter 27 is constituted by a 2-bit counter for counting the 1 V pulse of the vertical decoder 25 by 0 to 3 corresponding to two frame periods in the PAL-system and to generate a signal to control the phase of a vertical color burst blanking period. The composite pulse generator 28 is used to generate a composite pulse signal in accordance with outputs of the horizontal pulse generator 23 and the vertical pulse generator 26 and the selector 29.

Figure 8:
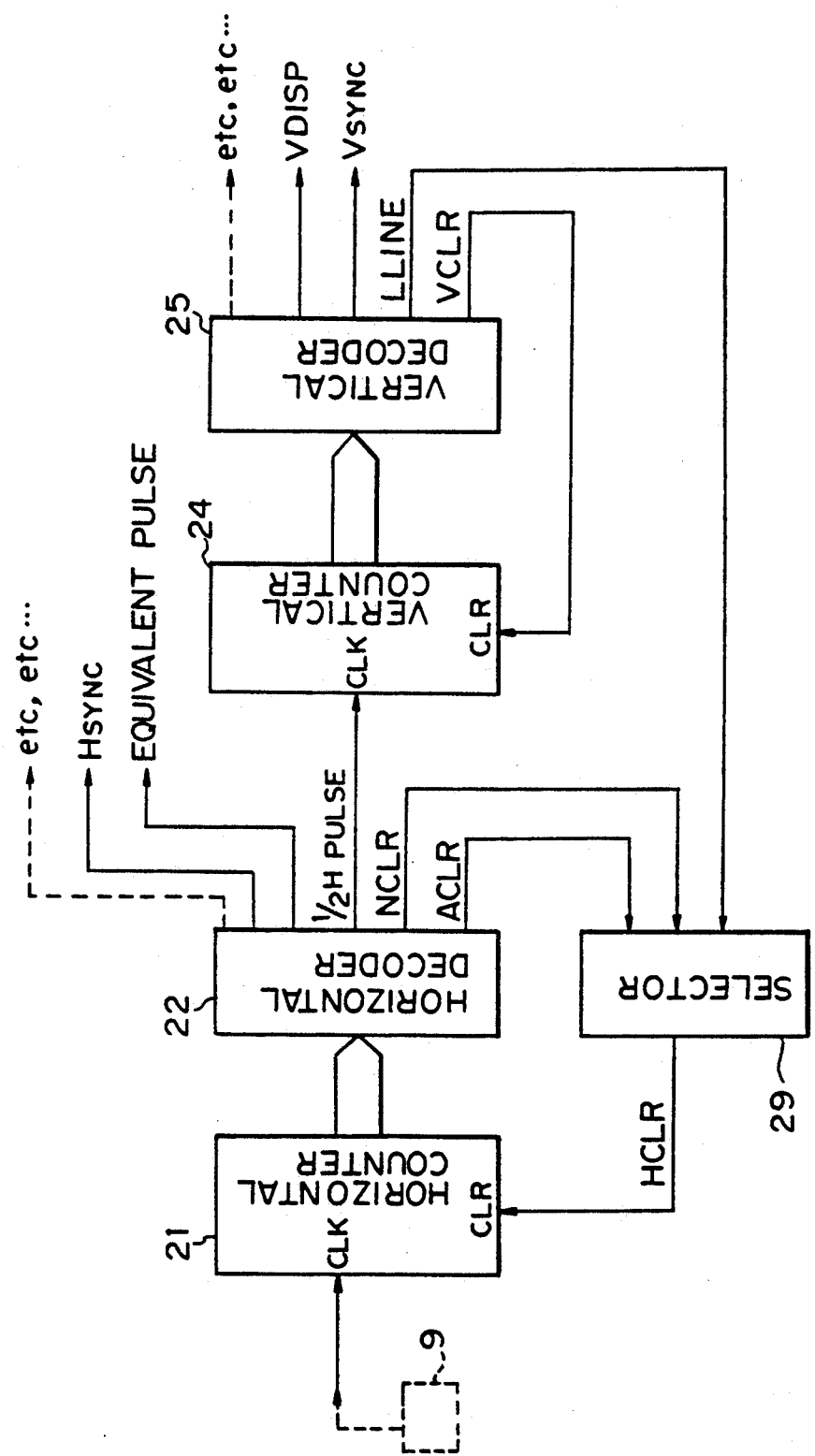
FIG. 8 is a block diagram indicating an essential portion of the example of the SYNC generator shown in FIG. 7.

FIG. 8 is a block diagram indicating an essential portion of the example of the SYNC generator shown in FIG. 7. As shown in FIG. 8, the SYNC generator 19 comprises a horizontal counter 21, a horizontal decoder 22, a vertical counter 24, a vertical decoder 25, and a selector 29.

As shown in FIG. 8, in the horizontal counter 21, two kinds of horizontal scanning periods are counted, wherein, one is a normal horizontal scanning period ($1H_{NORMAL}$) having a length of $[4F_{SC} \times 1135]$ corresponds to a length counting the basic clock ($4F_{SC}$) by 0 to 1134, and the other is a long horizontal scanning period ($1H_{LONG}$) having a length longer by $[4F_{SC} \times 2]$ than that of the normal horizontal scanning period $1H_{NORMAL}$. Namely, the long horizontal scanning period $1H_{LONG}$ having a length of $[4F_{SC} \times 1137]$ corresponding to a length counting the basic clock ($4F_{SC}$) by 0 to 1136. Note, the longer length of $[4F_{SC} \times 2]$ in the long horizontal scanning period $1H_{LONG}$ corresponds to the additional areas located at the end portion of each of the 312th and 625th scanning lines shown in FIG. 5A. Further, the long horizontal scanning period $1H_{LONG}$ is included only one time in each one vertical scanning period 1 V (or one field).

Note, in FIGS. 7 and 8, the horizontal counter 21 corresponds to the counter unit BB, the horizontal decoder 22 corresponds to first and second clear signal generation units CC and DD, and the selector 29 corresponds to selector unit EE in FIG. 4. Further, in FIG. 8, a crystal oscillator 9 corresponds to the clock signal generation unit AA.

Figures 9, 10:
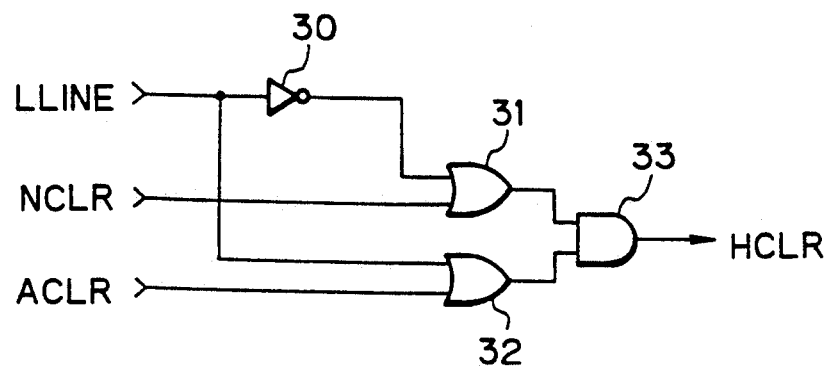
FIG. 9 is a circuit diagram indicating an example of the ladder register and analog switch shown in FIG. 6.
FIG. 10 is a diagram indicating truth values of the ladder register and analog switch shown in FIG. 9.

FIG. 9 is a circuit diagram indicating an example of the ladder register and analog switch shown in FIG. 6, and FIG. 10 is a diagram indicating truth values of the ladder register and analog switch shown in FIG. 9.

As shown in FIG. 9, the selector 29 comprises an inverter 30, OR gates 31, 32, and an AND gate 33, wherein one of the two clear signals (NCLR, ACLR) output from the horizontal decoder 22 is selected and determined as a clear signal (HCLR) of the horizontal counter 21.

In the selector 29, when a selection control signal (LLINE) which is once output from the vertical decoder 25 during one vertical scanning period is at a nonactive state ("1"), one clear signal NCLR for the normal horizontal scanning period $1H_{NORMAL}$ is selected. Conversely, in the selector 29, when the selection control signal LLINE is at an active state ("0"), the other clear signal ACLR for the long horizontal scanning period $1H_{LONG}$ is selected. Namely, the clear signal ACLR is only once selected during one vertical scanning period (or one field).

Note, these clear signals NCLR and ACLR are output from the horizontal decoder 22 through the horizontal counter 21, and the horizontal counter 21 counts the basic clock ($4F_{SC}$) by 0 to 1134 (1135 times) or 0 to 1136 (1137 times). Namely, the clear signal NCLR corresponds to the normal horizontal scanning period $1H_{NORMAL}$ having a length of $[4F_{SC}\times1135]$, and the clear signal ACLR corresponds to the long horizontal scanning period $1H_{LONG}$ having a length of $[4F_{SC}\times1137]$.

Figure 11:
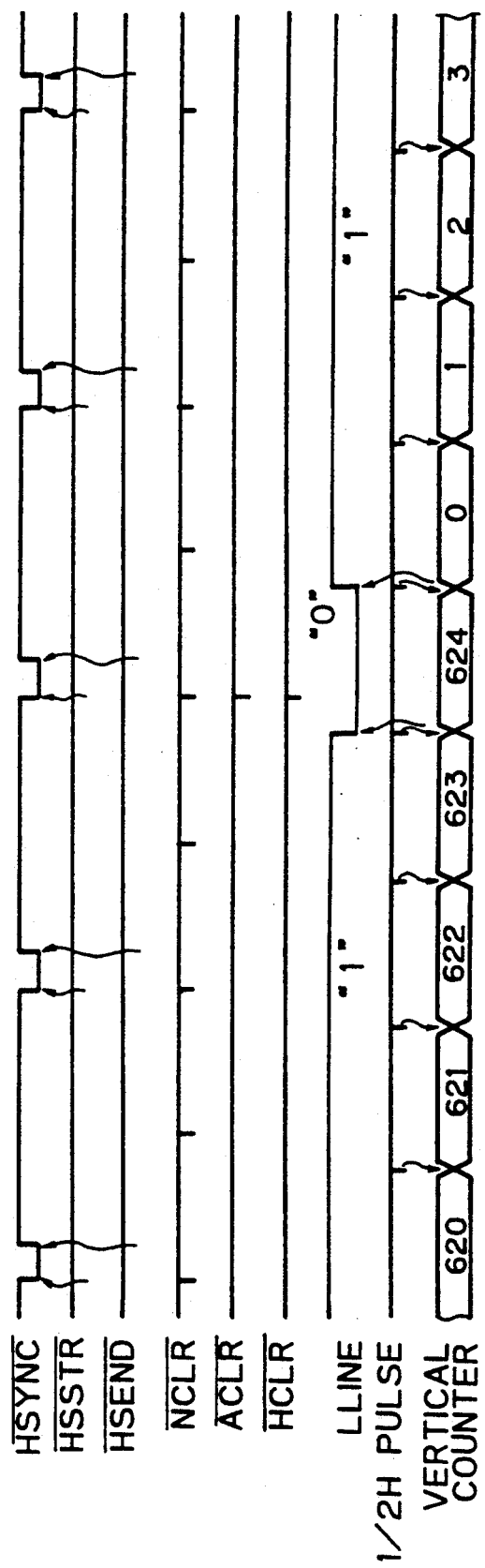
Figure 12:
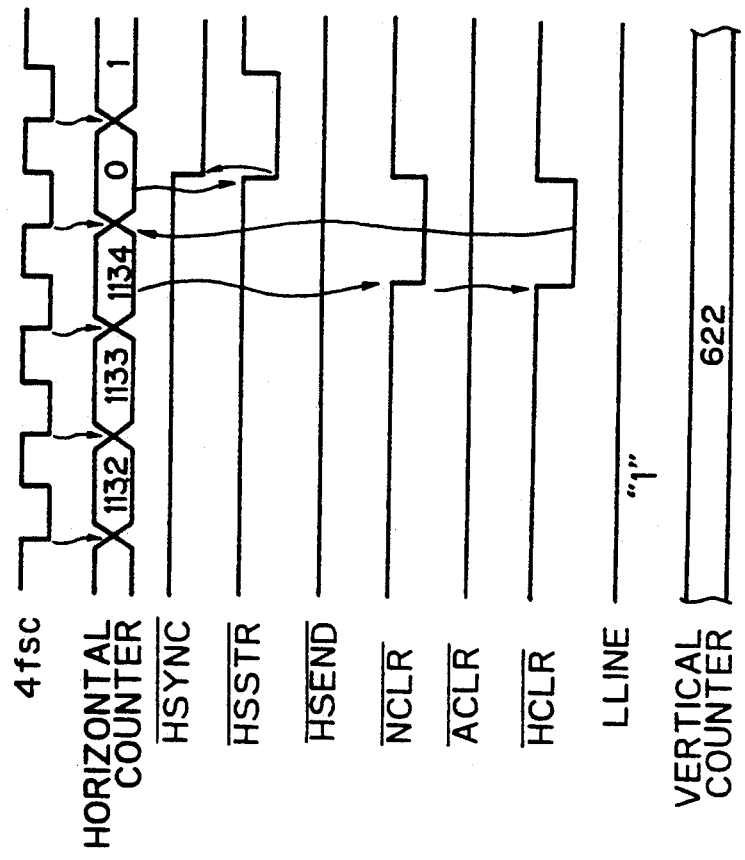

FIGS. 11 to 13 are diagrams indicating operational waveforms of the embodiment of the device for generating the horizontal synchronizing signal according to the present invention.

As shown in FIG. 11, when the selection control signal LLINE is specified at "1", or when the count value of the vertical counter 24 is specified from 0 to 623 corresponding to the scanning lines 1 to 624 shown in FIG. 5A, the horizontal counter 21 is cleared at the timing of one clear signal NCLR, and the counter value of the horizontal counter 21 is determined from 0 to 1134 (1135 times) corresponding to the normal horizontal scanning period $1H_{NORMAL}$ whose length is defined to $[4F_{SC}\times1135]$ (with reference to FIG. 12). Conversely, as shown in FIG. 11, when the selection control signal LLINE is specified at "0", or when the count value of the vertical counter 24 is specified at 624 corresponding to the scanning line 625 shown in FIG. 5A, the horizontal counter 21 is cleared at the timing of the other clear signal ACLR, and the counter value of the horizontal counter 21 is determined from 0 to 1136 (1137 times) corresponding to the long horizontal scanning period $1H_{LONG}$ whose length is defined to $[4F_{SC}\times1137]$ (with reference to FIG. 13). Note, a difference [2] of the counter value of the horizontal counter 21, which means $4F_{SC}\times2$, corresponds to $F_{SC}\times(\frac{1}{2})$.

Namely, the horizontal counter 21 of the present embodiment normally operates as a 1135-counter, but the horizontal counter 21 once operates as a 1137-counter during one vertical scanning period 1 V. Therefore, one horizontal scanning period of operating as the 1135-counter can be determined to $[F_{SC}\times\frac{1}{2}\times I]$ (where, I: integral number), and the horizontal scanning signal, which is longer by a half period of the color subcarrier frequency than the normal horizontal scanning signal, can be once inserted into one vertical scanning period 1 V.

Consequently, by using the above described approximate equation (4), where the basic clock is determined to $4F_{SC}$, only one horizontal scanning period in one field can be made longer by a half of $F_{SC}$ than the normal horizontal scanning period by only adding the counter 29 without increasing a circuit scale, so that phases of the chrominance signals in the continuous fields are inverted and a dot interference between the adjacent scanning lines can be deleted.

Therefore, stripes do not appear on the display image, or a flicker (dot interference) is not caused, so that the dot interference is avoided by an easy improvement without increasing the circuit scale.

In the above described embodiments, each of the scanning lines (312th and 625th scanning lines shown in FIG. 5A) located at the lower side of the display image includes an additional area corresponding to $2F_{SC}$, but the additional area corresponding to $2F_{SC}$ (or $\frac{1}{2}$ wave length) is not limited to the 312th and 625th scanning lines. Nevertheless, in each field, the additional area is preferably provided for the end portion of the scanning line close to the upper or lower sides. Further, the additional area is not limited to the area corresponding to $2F_{SC}$ (or $\frac{1}{2}$ wave length), but also the additional area can be specified as odd multiples of $2F_{SC}$ (or $\frac{1}{2}$ wave length), e.g., 3/2 wave length, or 5/2 wave length. Namely, the horizontal counter 21 is not limited to be operated as a 1135-counter or 1137-counter, but the horizontal counter 21 can be constituted as a 1135-counter or 1141-counter, or a 1135-counter or 1145-counter. In addition, the horizontal counter 21 can be determined to operate as any number counter so that phases of the chrominance signals in the continuous fields can be inverted. Furthermore, in the above description, the operational frequency of the 1137-counter is determined to at least once during one vertical scanning period 1 V, but the operational frequency thereof is not limited to once.

Many widely differing embodiments of the present invention may be constructed without departing from the spirit and scope of the present invention, and it should be understood that the present invention is not limited to the specific embodiments described in this specification, except as defined in the appended claims.

I claim:

1. A device for generating a horizontal scanning periodic signal used for a PAL-system comprising:

a clock generation means for generating a basic clock having a frequency specified as any multiple of a color subcarrier frequency;

a counter means, connected to said clock generation means, for counting said basic clock until a specific clear signal is input;

a first clear signal generation means, connected to said counter means, for generating a first signal when a value of said counter means is coincident with a normal horizontal scanning period, by monitoring the value of said counter means;

a second clear signal generation means, connected to said counter means, for generating a second signal, when a value of said counter means is coincident with a longer horizontal scanning period by an odd multiple of a half period of the color subcarrier frequency than the normal horizontal scanning period, by monitoring the value of said counter means; and a selector means, connected to said first and second clear signal generation means and said counter means, for selecting one of the first signal and the second signal, wherein said second signal is at least one signal selected during one vertical scanning period.

2. A device for generating a horizontal scanning periodic signal as claimed in claim 1, wherein said device is used for a PAL-system using the following approximate equation for the color subcarrier frequency $F_{SC}$:

$$F_{SC}=((4\times n-1)/4)\times F_L$$

wherein $F_L$ denotes a horizontal frequency and n denotes a position of the color subcarrier in a video signal band.

3. A device for generating a horizontal scanning periodic signal as claimed in claim 1, wherein said basic clock is specified as four times a color subcarrier frequency.

4. A device for generating a horizontal scanning periodic signal as claimed in claim 1, wherein said second clear signal generation means generates the second signal when a value of said counter means is coincident with a period longer by a half period of the color subcarrier frequency than the normal horizontal scanning period.

5. A device for generating a horizontal scanning periodic signal as claimed in claim 4, wherein said first clear signal generation means is constituted by a 1135-counter, and said second clear signal generation means is constituted by a 1137-counter.

6. A device for generating a horizontal scanning periodic signal as claimed in claim 1, wherein the second signal is selected at the scanning line located on the upper or lower side of each field.

7. A device for generating a horizontal scanning periodic signal as claimed in claim 6, wherein the second signal is selected at the 312th or 625th scanning lines of each field.

* * * * *